(12) United States Patent
Häärä

(10) Patent No.: US 11,759,786 B2
(45) Date of Patent: Sep. 19, 2023

(54) ADJUSTABLE MOUNT FOR AUTOMATIC LIQUID HANDLING APPLICATIONS

(71) Applicant: Sartorius Biohit Liquid Handling Oy, Helsinki (FI)

(72) Inventor: Anssi Häärä, Helsinki (FI)

(73) Assignee: Sartorius Biohit Liquid Handling Oy, Helsinki (FI)

( * ) Notice: Subject to any disclaimer, the term of this patent is extended or adjusted under 35 U.S.C. 154(b) by 4 days.

(21) Appl. No.: 17/161,911

(22) Filed: Jan. 29, 2021

(65) Prior Publication Data

US 2021/0237091 A1    Aug. 5, 2021

(30) Foreign Application Priority Data

Feb. 5, 2020  (EP) .................................. 20155634

(51) Int. Cl.
*B01L 9/00*    (2006.01)
(52) U.S. Cl.
CPC ........... *B01L 9/54* (2013.01); *B01L 2200/025* (2013.01)
(58) Field of Classification Search
CPC ........ B01L 9/54; B01L 2200/025; B01L 3/02; G01N 35/10; F16B 2/16; F16B 2/185
See application file for complete search history.

(56) References Cited

U.S. PATENT DOCUMENTS

| 6,373,707 | B1 | 4/2002 | Hutchins |
| 9,568,281 | B1 | 2/2017 | Chen |
| 2007/0053797 | A1* | 3/2007 | Muraishi ............ G01N 35/1095 422/400 |
| 2014/0004020 | A1* | 1/2014 | Tubbs ...................... B01L 9/54 422/564 |
| 2017/0241886 | A1 | 8/2017 | Harris |
| 2018/0246134 | A1* | 8/2018 | LaChance ........... B01L 3/50273 |

FOREIGN PATENT DOCUMENTS

| CN | 109268360 A | * | 1/2019 |
| KR | 20070016544 A | | 2/2007 |

* cited by examiner

*Primary Examiner* — Matthew D Krcha
*Assistant Examiner* — Austin Q Le
(74) *Attorney, Agent, or Firm* — Laine IP Oy

(57) ABSTRACT

According to an example aspect of the present invention, there is provided an apparatus for mounting a device on a manipulator, wherein a second unit is adjustably attached to a first unit so that it is movable in at least one direction with respect to the base plate and wherein the first unit has at least a locked position and an open position, the mounting rail being movable with respect to the first unit when the first unit is in the open position and wherein the mounting rail is fixed with respect to the first unit when the first unit is in the closed position.

9 Claims, 9 Drawing Sheets

ADJUSTABLE MOUNT FOR AUTOMATIC LIQUID HANDLING APPLICATIONS

FIELD

This disclosure provides a mounting solution for devices, in particular in the field of automated liquid handling applications. More specifically, the present disclosure provides a mounting system for rapid adjustment of devices mounted on a pipette handling apparatus.

BACKGROUND

In laboratories or similar scientific or industrial settings, it is beneficial to have automatic liquid handling systems for routine or very precise work. In such automated liquid handling applications, modular solutions such as pipette modules may be used to increase the flexibility of the liquid handling system. In such cases, it is beneficial to mount the module on a liquid handling workstation, such as a pipette handling robot or a automated or computer-controlled multi-axis router. After mounting, the robot or router will be able to move the modules in the desired fashion. Any such liquid handling workstation may comprise modular on non-modular pipettes.

The present disclosure provides a device and method for mounting modules onto actuating devices. More specifically, the present disclosure provides a device and method for easy attachment of such modules to the actuating device, as well as a possibility to rapidly attach, adjust or remove modules using a self-centering attachment mechanism.

SUMMARY OF THE INVENTION

The invention is defined by the features of the independent claims. Some specific embodiments are defined in the dependent claims.

According to a first aspect of the present invention, there is provided an apparatus for mounting a device to a base plate of a manipulator, the apparatus comprising: at least one base plate; at least one locking mechanism or first unit attached to the base plate, the locking mechanism comprising a groove and a locking part, and at least one mounting rail located within the groove of the locking mechanism, the mounting rail comprising: at least one notched or grooved rail, at least one mount location, wherein the mounting rail is adjustably attached to the locking mechanism so that it is movable in at least one direction with respect to the base plate and wherein the locking mechanism has at least a locked position and an open position, the mounting rail being movable with respect to the locking mechanism when the locking mechanism is in the open position and wherein the mounting rail is fixed with respect to the locking mechanism when the locking mechanism is in the closed position.

According to a second aspect of the present invention, there is provided A method for adjusting the mount position of a device relative to a base plate of a manipulator using a paired locking mechanism and mount rail, the method comprising: rotating a locking shaft from a closed position to an open position, wherein the locking mechanism is configured so that when the locking shaft is rotated to cause a first and second end of a locking part to retract from a notch in a mount rail, moving the mount rail with respect to the mount apparatus in such a manner that a ball plunger of the mount apparatus is located within a notch of the mount rail at the beginning and end of the movement, rotating the locking shaft back to the original position, wherein the locking mechanism is configured so that the rotation causes the ends of the locking part to extend into the notches of the mount rail and lock the mount rail in place with respect to the locking mechanism.

Various embodiments of the first or second aspect may comprise at least one feature from the following bulleted list:

- wherein the locking part comprises at least one ball bearing or ball plunger and wherein the locking mechanism is configured so that said ball bearing or ball plunger is inserted into a notch of the notched rail,
- wherein the locking part comprises at least one pin or detent and wherein the locking mechanism is configured so that said pin or detent is inserted into a notch of the notched rail,
- wherein the locking mechanism is configured so that the pin or detent is inserted into a notch of the rail when the locking mechanism is in the closed position and wherein the pin or detent is not inserted into a notch when the locking mechanism is in the open position,
- wherein the locking mechanism is configured so that the ball plunger retracts from the notch when the mount rail is moved in a first direction,
- wherein the locking mechanism is comprises a locking shaft, said shaft having an asymmetrical cross-section so that the shaft has at least a first diameter and a second diameter,
- wherein the open position corresponds to the first diameter of the shaft and the closed position corresponds to the second diameter of the shaft,
- wherein the groove of the locking mechanism has a self-centering profile,
- wherein the manipulator is a liquid handling system and the mounted device is a pipette or liquid dispensing means.

EMBODIMENTS

Figure 1:
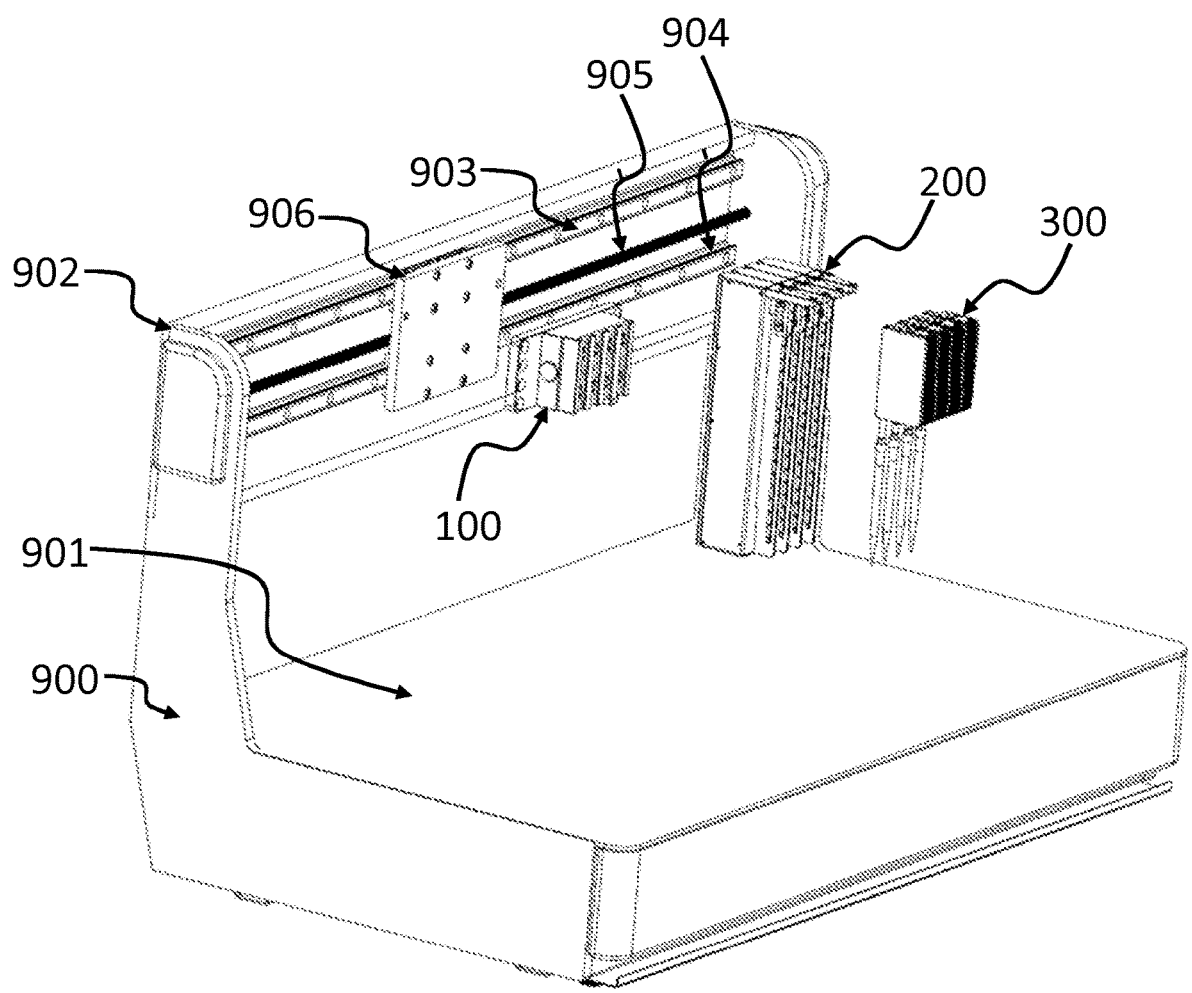
FIG. 1 illustrates a schematic exploded view of an exemplary liquid handling system in accordance with at least some embodiments of the present invention.

In this disclosure a mechanism and a corresponding method for attaching or mounting devices to one another is introduced. Said mechanism and method allow for quick adjustment of the position of the mounted device with respect to the mount. By using the means described within this disclosure, multiple devices may be attached to a single mount point, each device having a vertical position independent of the others and being movable and adjustable independently in the vertical directions.

This disclosure comprises a mounting method and a mounting apparatus for attaching entities to one another in an adjustable manner. Entities may comprise devices, apparatuses, modules, etc. When a module is referred to, a module such as exemplary module 300 may comprise one or more of the following: a pipette, a sensor, a camera, a multimodule mount, an actuator, a manipulator, a plate rack.

A router or manipulator may be used with at least some of the embodiments of this disclosure. Such a router or manipulator may comprise a movable endpoint or base plate, wherein the endpoint is movable in at least two directions, for example the X and Y directions. The mount rail apparatus 200 may comprise a mechanism providing movement in at least one direction, for example the Z direction. Therefore, as multiple mount rail apparatuses may be used with a single router or manipulator, a beneficial effect provided by the present solution is to provide at least one independent axis of movement for each module 300 mounted on the liquid handling system via a rail apparatus 200.

In at least some further embodiments the router is an XYZ router, wherein the present solution provides each module with an independent axis of movement which is beneficial e.g. when using liquid containers of different heights.

At least some of the surfaces discussed in this disclosure will be defined as facing in a certain direction or towards a certain element. The term facing with respect to a surface in the context of this disclosure may be understood so that the normal of the plane points in the direction indicated. In other words, a vector perpendicular to the surface points at least roughly, i.e. within 45 degrees, in the stated direction.

At least some of the objects, parts, shapes or profiles discussed in this disclosure will have a cross-section. Such a cross-section in the context of the disclosure may be understood as representing a view wherein an imaginary plane intersects the object so that a remainder of the object may be viewed starting from said plane.

Several of the elements of this disclosure have a longitudinal direction. The longitudinal direction is intended to refer to the long orthogonal axis of the body of the element. In addition, some of the elements are shaped so that they have a cross-section, which then extends in the longitudinal direction throughout the length of the element. This cross-section is referred to as the transverse cross-section.

In this disclosure, several elements, parts, modules, or assemblies are attached to each other. Such attachment may be facilitated by any of the following solutions singly or jointly: adhesive, hook-or-loop fastener, screws, bolts, clasps, locks, nails, snap-fits, pins, snap-fasteners, spring elements such as ball plungers, zip-ties, magnets, electro-magnets. Pins may comprise plastic, metal such as aluminium, iron, titanium, steel, alloy steel, bearing steel, stainless steel or any combination or alloy thereof. Pins may be sized from a diameter of 1 millimeter to up to 12 millimeters, preferably having a diameter of substantially 6 millimeters. Correspondingly, the length of the at least one pin may be from 5 millimeters to 50 millimeters, preferably having a length of substantially 10 millimeters In this disclosure, parts may be actuated manually or automatically. Manual movement may performed directly by the hand of an operator. Manual or automatic movement may also be performed using equipment comprising: a pushbutton, a handle, a lever, a pedal, a control apparatus, a hydraulic cylinder, a leadscrew, a bearing, a magnet, an electro-magnet, an actuator, an electric motor, a pneumatic cylinder, a linear variable differential transformer.

The material of the parts of this disclosure may be aluminium, iron, titanium, steel, alloy steel, bearing steel, stainless steel or any combination or alloy thereof. An exemplary material suitable for use in the context of the disclosure is 6082-T6 aluminum which may be anodized. Such a material is suitable for laboratory use and has a good strength to weight ratio. In addition, plastics may used. In an exemplary embodiment, the system may comprise non-metallic parts for the majority of the parts in order to avoid metal contamination within the laboratory setting. For such an embodiment, robust plastics such as glass fiber filled plastic, carbon fiber filled plastic or Polyether ether ketone, PEEK, may be used. A benefit of avoiding metal within the embodiment is reducing the possibility of metal contamination within the laboratory setting.

In several of the elements of this disclosure, a groove or notch is present. Such a groove shall be defined as having a depth, a width and an opening comprising a width and depth. It is understood that the opening width may be narrower than the groove width at the groove depth, resulting in a groove with cross-section shaped like an inverse letter T. Exemplary grooves presented herein are inter alia grooves 206, 207 and 213 which may be used in at least some embodiments of the present disclosure.

In the context of this disclosure, the term "self-centering" means that that a groove or notch is machined so that the intended counterpart will be directed towards the center of the notch via sloped surfaces or other means. Therefore, even if the counterpart is initially located off center with respect to the groove, when the distance between counterpart and groove is reduced via mechanical force, the slope directs the counterpart to the correct center position. Therefore a self-centering groove is configured so that when a suitably sized object, i.e. one which is sized appropriately with respect to the groove dimensions, is placed within the groove, said object will be self-centered with respect to the groove sides. In at least some of the embodiments of this disclosure, the self centering is done in at least two directions which results in the rotation being locked, that is to say limited, as well.

In at least some of the embodiments of the disclosure, a mount device such as mount apparatus 100 is used in conjunction with a mount rail apparatus, such as mount rail apparatus 200, to achieve an adjustable and precise attachment between a liquid handling device 900 and a module 300. Multiple embodiments of the mount rail apparatus and mount apparatus are disclosed herein; it is to be understood that the various mount rail apparatuses and mount apparatus so disclosed will be compatible and thus usable with one another, unless explicitly stated. In other words, a mount rail apparatus will be suitable for use with several types of mount apparatuses and locking mechanisms and vice versa. In at least some of the embodiments of this disclosure, the transverse notches are sloped which allows for the self centering functionality as described within the disclosure.

A mount device may comprise one or more slots or grooves for mount rail apparatus. In an exemplary embodiment, the mount device comprises 1 to 99 slots, preferably less than 13 slots. The width of the individual rail mount comprising a independent z movement may be less than 18 millimeters, beneficially 17.4 millimeters which corresponds well with microwell plates, for example microwell plates in accordance with liquid handling standard ANSI SLAS 1-2004, (formerly recognized as ANSI/FSBS 1-2004), An exemplary method in accordance with this disclosure is performed as follows:
1. Rotating the locking shaft of the mount apparatus.
2. Moving the rail apparatus and attached devices with respect to the mount apparatus.
3. Rotating the locking shaft back to the original position, thus locking the rail apparatus in place with respect to the mount apparatus.

Figure 8:
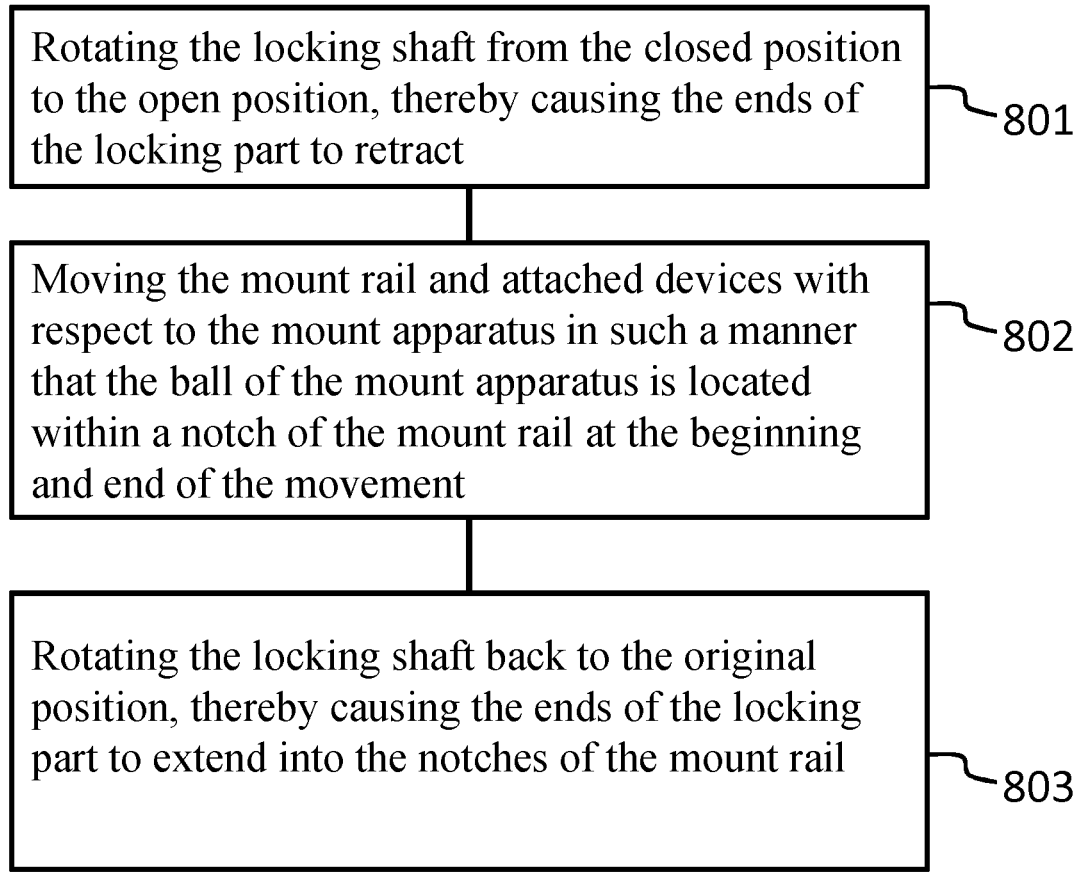
FIG. 8 is a flow graph illustrating an exemplary method usable with at least some of the embodiments of the present invention.

The steps are also listed as part of the flowchart in FIG. 8.

In step 801, the locking shaft is rotated. This rotation may be performed manually, by using e.g. a handle attached to one or both ends of the shaft, or by a mechanical or automated means of movement. The rotation of the shaft results in the curved surface of the shaft rotating away from the locking part body and the flat surface of the shaft rotating to face the locking part body. The rotation of the shaft and therefore the reduction of the distance between the center point of the shaft to the locking part body results in the locking part body being moved to contact the flat surface of the locking shaft. Said movement may be facilitated at least in part by a retraction or extension of the central spring. This situation, wherein a flat surface of the shaft is facing the mount rail and the locking part body is at its furthest position away from the mount rail may be called the "open position" in the context of this disclosure. Correspondingly, the position wherein the curved surface of the shaft is oriented to face the locking part body is called the "closed position". The movement of the locking part body in a direction away from the mount rail results in the ends of the locking part body being retracted from the notches in the mount rail. However, the mount rail and the attached devices remain stationary with respect to the mount apparatus, because the plunger spring is compressed between the ball plunger and the locking part body, exerting a force which pushes the ball plunger into the notch of the mount rail and prevents the rail from sliding downwards due to gravity. In at least some embodiments, the movement prevention in the open or closed position may be assisted at least in part by friction between the rail and the groove of the locking mechanism.

The springs within the locking mechanism which may comprise at least one of the plunger spring, the central spring and the cushion spring, are usable as follows. The plunger spring 112 is primarily used to move the ball 111 within the ball plunger assembly 120 and therefore allow the indexing operation between ball and notch. The central spring 113 is primarily used to provide a motive force away from the rail with respect to the locking part body 111, i.e. it pushes the locking mechanism into the open position. The spring 114 is a cushioning spring which allows some mechanical play between shaft 110 and body part 101 and helps resolve issues due to e.g. tolerance variations in the surface of shaft 110. Turning the handle of shaft 110 will alter the tension of at least some of the springs 112, 113, and 114. A spring as discussed herein may be any mechanism which stores mechanical energy. Exemplary spring types which are suitable for use with the invention are coil springs, helical springs, cantilever springs, gas springs, volute springs, hairsprings, wave springs. Leaf springs may be elliptic, semi-elliptic, parabolic or other types of leaf spring. Cushion-type springs may comprise a body which is designed to deform and reform, made out a suitable material such as rubber, urethane, metal, thermoplastic such as polyethylene. Said body may include at least one cavity.

In Step 802, the mount rail apparatus may be moved upwards and downwards with respect to the mount apparatus. This movement may be performed manually, or by a mechanical or automated means of movement. When the mount rail is moved, the ball or ball bearing of the ball plunger comes into contact with the sloped edge of the rail notch, which leads to the plunger spring being compressed further and the ball exiting the notch. When the rail is moved in an amount which results in the ball encountering another notch, the spring decompresses and force is exerted between the mount rail and the locking part body via the ball plunger. As a result, if the movement is paused when the ball is in the notch, the mount rail remains stationary with respect to the locking system, even if the locking shaft is in the open position. In a scenario wherein the ball is not in the notch, depending on the weight of the mount rail and the attached devices, the mount rail may remain stationary due to the friction between the ball and the surface of the mount rail. However, in the event that the effect of gravity on the mount rail is sufficient to overcome the friction, the mount rail will travel downwards until the ball enters another notch, at which point the downwards motion of the mount rail will stop. In order to achieve a high precision and strong connection between the mount rail and the mount apparatus, the ball should be in the notch when the mount apparatus locking shaft is turned to the locked or closed position. The use of the ball plunger in conjunction with the notch results in indexed movement, i.e. the movement length is the distance from one notch to another.

In Step 803, when the mount rail has been adjusted automatically or manually to the desired position, the locking shaft may be rotated in an opposite direction to the opening motion, i.e. the locking shaft position is changed from "open" to "closed". The curved surface of the shaft pushes the locking part body closer to the mount rail and the ends of the locking part body enter the corresponding notches of the mount rail, locking the arrangement of the locking mechanism and the mount rail securely into place. In a further exemplary embodiment, the situation of Step 803 is identical to that of Step 801 with the difference that the rail has been moved.

After steps 801, 802 and 803 have been completed, the apparatus is usable in the adjusted position. A benefit of the secure locking provided by the elements of this disclosure are that fast movements, including large acceleration and deceleration, are possible with high precision due to the rigidity of the connection between the base plate and locking mechanism, the locking mechanism and the rail, and the rail and the element to be moved.

At least some of the embodiments in accordance with this disclosure are sized according to the size of the ball bearing or ball plunger within the locking mechanism, which in part defines the notch dimensions and therefore the rail dimensions. In exemplary embodiments, the diameter of the ball is between 0.8 millimeter and 20 millimeters, preferably 6 millimeters. In certain exemplary embodiments where heavy parts are attached to the mounting system, the length of the mounting groove on the mount apparatus may be increased or a larger ball size is selected.

It is understood that variations and combinations in accordance with the present disclosure which relate to rail and groove dimensioning are within the understanding of the skilled artisan.

Turning then to the size of the element to be moved via the participation of the mounting system, the dimensions of the element may be any size and the weight of such an element may be between 1 gram and 100 kilograms, beneficially not more than 10 kilograms, in particular less than 5 kilograms. The dimensions listed herein are usable with one another.

FIG. 1 illustrates an exemplary embodiment of the mounting system shown attached in exploded form to a liquid handling system in accordance with at least some embodiments of the present invention. Multiple devices 200 and 300 are shown within FIG. 1. Liquid handling system 900 is comprised of planar surface 901 and gantry 902. The gantry provides rails 903 and 904 as well as axis or rod 905 for sideways movement of the mount plate 906. The liquid handling system 900 and especially the planar surface 901 may be utilized to allow at least some of the following: identification, positioning, measuring, imaging, verification, pipetting, liquid transfer. Objects usable with the liquid handling system may be at least one of the following: a pipette tip package, a disposable pipette tip package, a liquid vessel, a microwell plate, a bottle rack, a test tube rack, any other laboratory equipment, or a package or collective arrangement of any of the preceding objects. The liquid handling system, parts thereof, and the objects to be used with the system may comprise any material, especially thermoplastic materials are preferred for the ease of manufacturing, whereas metal materials are very durable.

FIG. 1 further shows an exemplary embodiment of mount, locking mechanism or first unit 100 which is removably attachable to mount plate 906. Mount plate 906 comprises means for attaching the mount such as holes which combined with bolts and nuts allow attachment in at least two orientations. In an exemplary embodiment, mount plate 906 comprises slots or grooves which, along with the nuts and bolts, allow attachment in any orientation. In turn, mount 100 is attachable to rail mount apparatus 200 which is attachable to liquid handling modules 300. FIG. 1 shows an exemplary configuration of a single mount 100 with four rail mount apparatuses 200 and four liquid handling modules 300. In accordance with the present disclosure there may be any number of mount plates 906, mounts 100, rail mount apparatuses 200 and modules 300 in a system. The mount plates may be positioned on the same axis of movement or on parallel or perpendicular axes to allow different types of mutually independent movement. In a further exemplary embodiment, the rail mount apparatuses 200 are of at least two different lengths, for example a first length of 200 millimeters and a second length of 400 millimeters, with the beneficial effect of the system being usable in liquid handling applications involving vessels of a of two different heights, wherein the height differential may be significant, for example between 10 millimeters and 400 millimeters.

Figure 2:
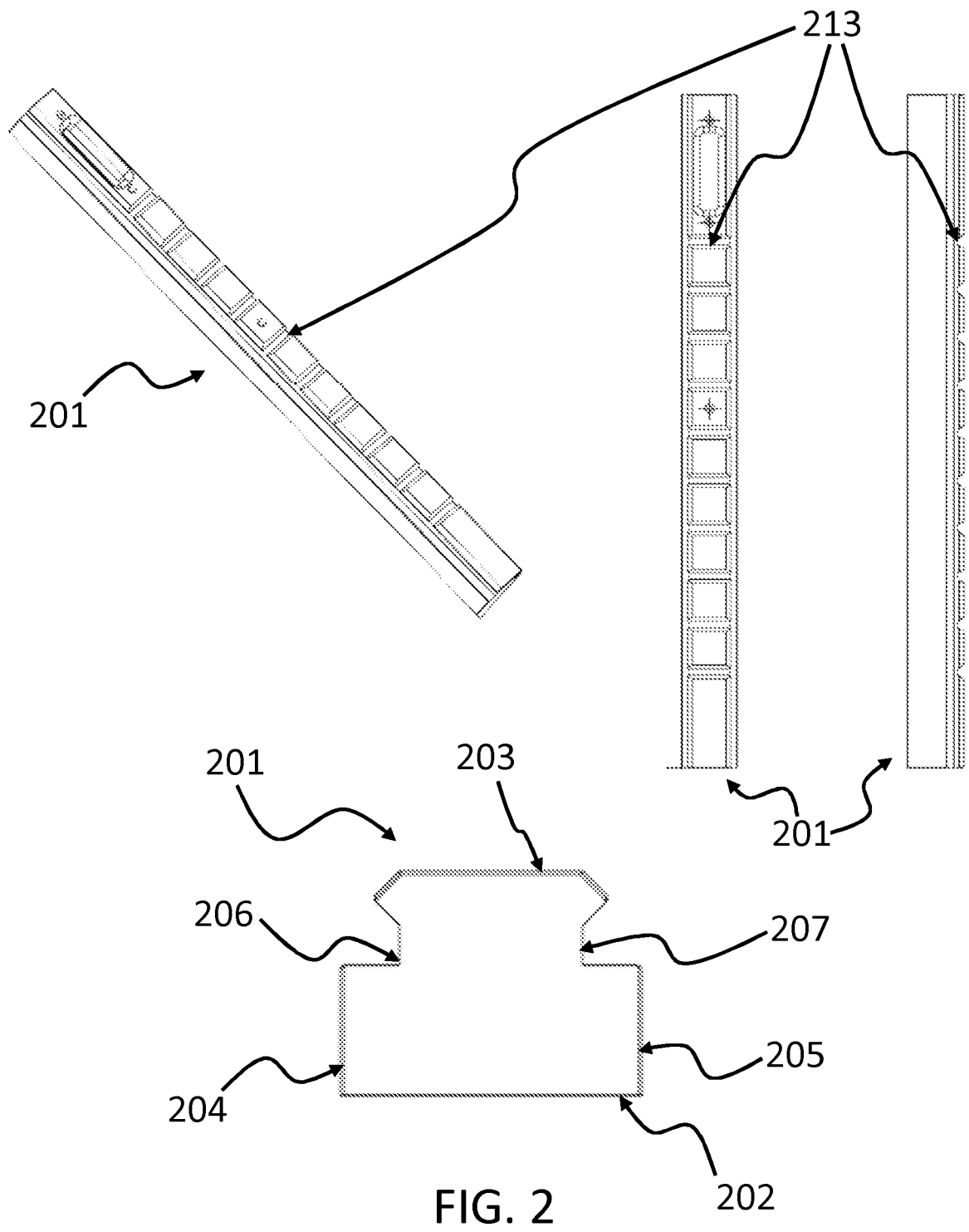
FIG. 2 illustrates a schematic view of an exemplary rail usable with a rail mount in accordance with at least some embodiments of the present invention.

FIG. 2 illustrates an exemplary embodiment of rail mount apparatus or second unit 200 which is capable of supporting at least some embodiments of the present disclosure. Rail mount apparatus 200 is comprised of rail 201 as well as rail mechanism 230. Rail 201 is comprised of bottom surface 202, top surface 203 which in at least some embodiments may be bevelled, as well as side surfaces 204 and 205. Side surfaces 204 and 205 respectively comprise notches or grooves 206 and 207. The rail 201 also comprises grooves 213 formed in the top surface in the transverse direction of the rail. The grooves 206, 207, 213 may have different dimensions or the same dimensions for ease of manufacturing. The rail 201 may comprise a visual scale, such as a metric scale, on one or more surfaces to aid in visually identifying the position of the rail module with respect to the mount apparatus.

The mount rail apparatus 200 is typically attached directly or indirectly to the module, part or assembly which is desired to be mounted, for example module 300. The rail 201 of the mount rail apparatus is comprised of grooves on at least one surface of the rail, preferably, grooves are located on three sides of the transverse cross-section, the fourth side being used to attach the rail to at least one of the following: the device desired to be mounted, at least one second rail, a housing, an actuating mechanism. At least one beneficial aspect of having grooves on multiple sides of the rail is that it allows for self-centering of the element mounted on the rail as well as improved attachment rigidity.

The rail 201 may be attached or fastened to the mount rail apparatus or any other element of the present disclosure by any of the following means singly or jointly: adhesive, hook-or-loop fastener, screws, bolts, clasps, locks, nails, snap-fits, snap-fasteners, zip-ties, magnets, electro-magnets. In addition, the rail may be directly fabricated as part of the device to be attached.

The rail may comprise ports and/or connectors such as wires for unidirectional, bidirectional or peer-to-peer transfer of at least one of: electrical power, communications, control signals, diagnostic information. The ports may be arranged on the vertical surfaces, that is to say surfaces 202 or 203 of the apparatus 200 or on the horizontal surfaces, i.e. the end surfaces of the rail. A beneficial advantage is obtained if the ports are situated on the vertical surface, as flat flexible cables may be used which are more durable in the flat plane than in the non-flat plane. The provision of vertical ports thus ensures that the flat cables are used in the more durable XY direction. However, the use of a horizontal port means that the rail surface may accommodate more grooves. The use of cables as an alternative to wireless transmission provides the benefit of a simpler, faster and more robust signal transmission.

In a first exemplary system, a plurality of rail apparatuses 200 may be each connected to a separate controller. Such a system improves the performance of the transmission by reduction of unnecessary signals, i.e. each apparatus 200 only receives signals meant for said apparatus. In a second exemplary system, a first rail apparatus is connected to the separate controller as well as to a second rail apparatus, which in turn is connected to the first apparatus as well as a third apparatus and so forth, forming what is known as a daisy chain connection. Such a system simplifies the wiring and reduces the space required by the connections. The rail 201 of the mount rail apparatus 200 extends in the longitudinal direction and may be any suitable length and have any suitable number of grooves. In an exemplary embodiment, the rail is 5 to 80 centimeters long, more preferably less than 50 centimeters long. Therefore, the appearance of the rail is similar but not necessary identical to rails used in the firearms industry, such as the rails defined by the standard MIL-STD-1913, for example. In an exemplary embodiment, the rail 201 may form the side of the z-axis movement including attachment points for the linear rail 233 of the mount rail apparatus 200. Such a embodiment is advantageous as the use of the accurately machined rail ensures that measurements and tolerances are accurate throughout the length of the apparatus 200. This can be achieved e.g. by having a portion of the rail extend in the transverse direction of the rail mount.

In an exemplary embodiment of the rail of the mount rail apparatus, the transverse cross-section of the rail is comprised of four surfaces as previously disclosed herein. The surfaces are arranged in an essentially orthogonal manner with respect to each other and thus the planes defined by the four surfaces form a rectangular cross-section. Of these, one surface faces the device or module to be attached to the rail and may be called the bottom surface in the context of this disclosure. The surface of the mount rail which is opposite from the bottom surface shall be referred to as the top surface 203 of the rail 201 in the context of this disclosure. This surface is comprised of a plane having transverse notches or grooves extending downwards towards the bottom surface of the rail. These may be called the top grooves 213 and they may be spaced evenly along the longitudinal dimension of the rail 201, or, in the alternative, they may be spaced unevenly. In an exemplary embodiment, the rail may comprise at least a part of the z-axis movement mechanism.

Turning then to the remaining two surfaces of the cross-section of the mount rail, these shall be referred to as the side surfaces in the context of this disclosure. In an exemplary embodiment, these surfaces may also comprise a plane and a groove 206, 207, the groove extending in the transverse direction of the rail towards the other side surface. In a further exemplary embodiment the side surfaces may by symmetrical (i.e. mirrored) with regards to each other. Grooves 206, 207, 213 may extend only a portion of the length of the surface with the beneficial effect of providing end stops to prevent attached elements from sliding off the end of the rail.

Figure 3:
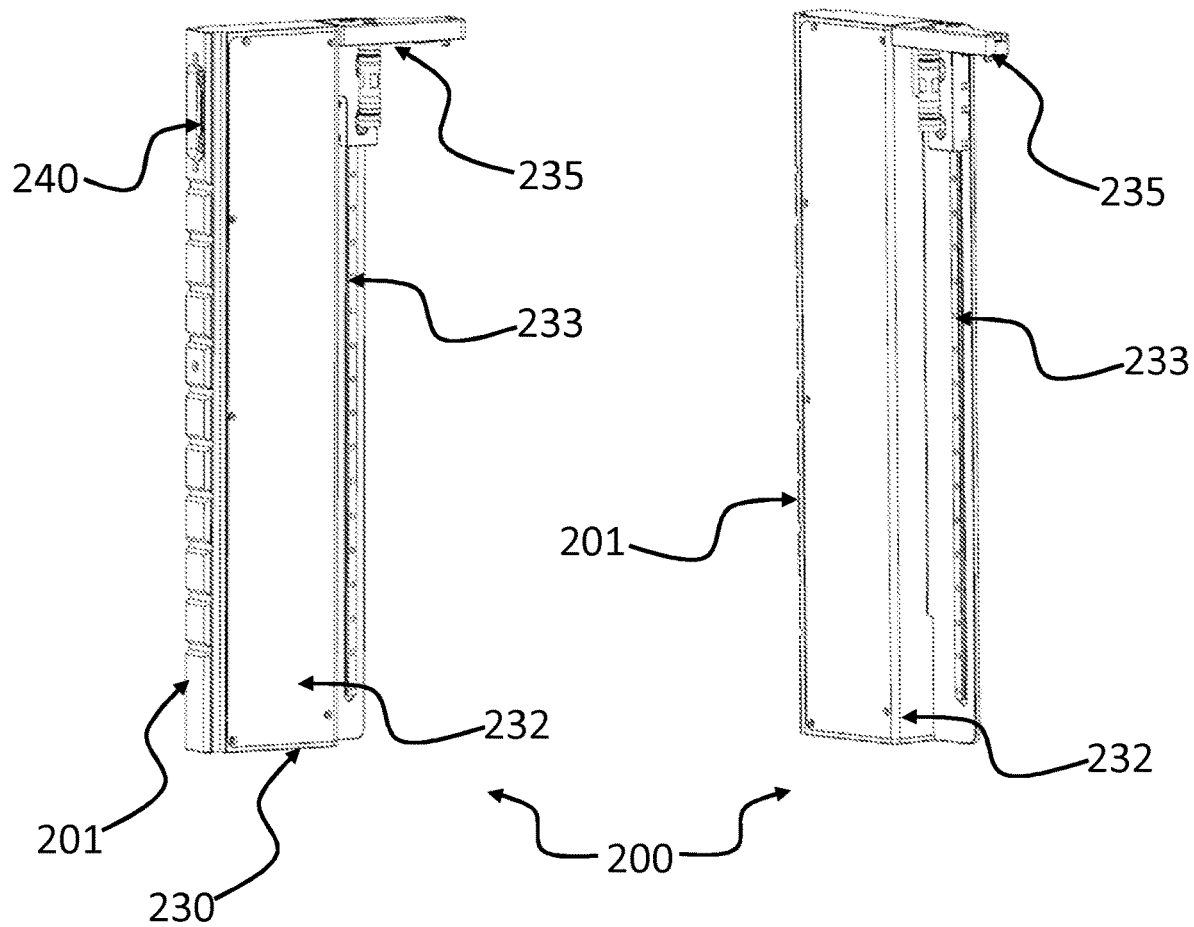
FIG. 3 illustrates a schematic view of an exemplary rail mount in accordance with at least some embodiments of the present invention.

FIG. 3 shows an exemplary embodiment of the rail 201 attached to the rail mechanism 230. The rail mechanism 230 is comprised of port 240, housing 232, and a vertical movement mechanism comprising linear rail 233, a mounting device or mounting mechanism 235. At least a part of the vertical movement mechanism may be located within the housing. The vertical movement mechanism provides movement for the mounting device 235 and any coupled devices in a first and second direction, i.e. up and down if the rail 201 is vertically arranged. In at least some embodiments, port 240 is configured to provide at least one of the following to the internal mechanism: communications, control instructions, power. The vertical movement mechanism may comprise one or more of the following: a motor, a controller comprising at least one processor core, a transmission, power transmission means such as cables. In at least some embodiments of the disclosure, the mounting mechanism 235 is configured to attach to at least one device, i.e. to provide an attachment point comprising at least one of a socket, shaft, plate, clip or port, to which the device may be removably attached via any of the fastening means disclosed herein.

Figure 4A:
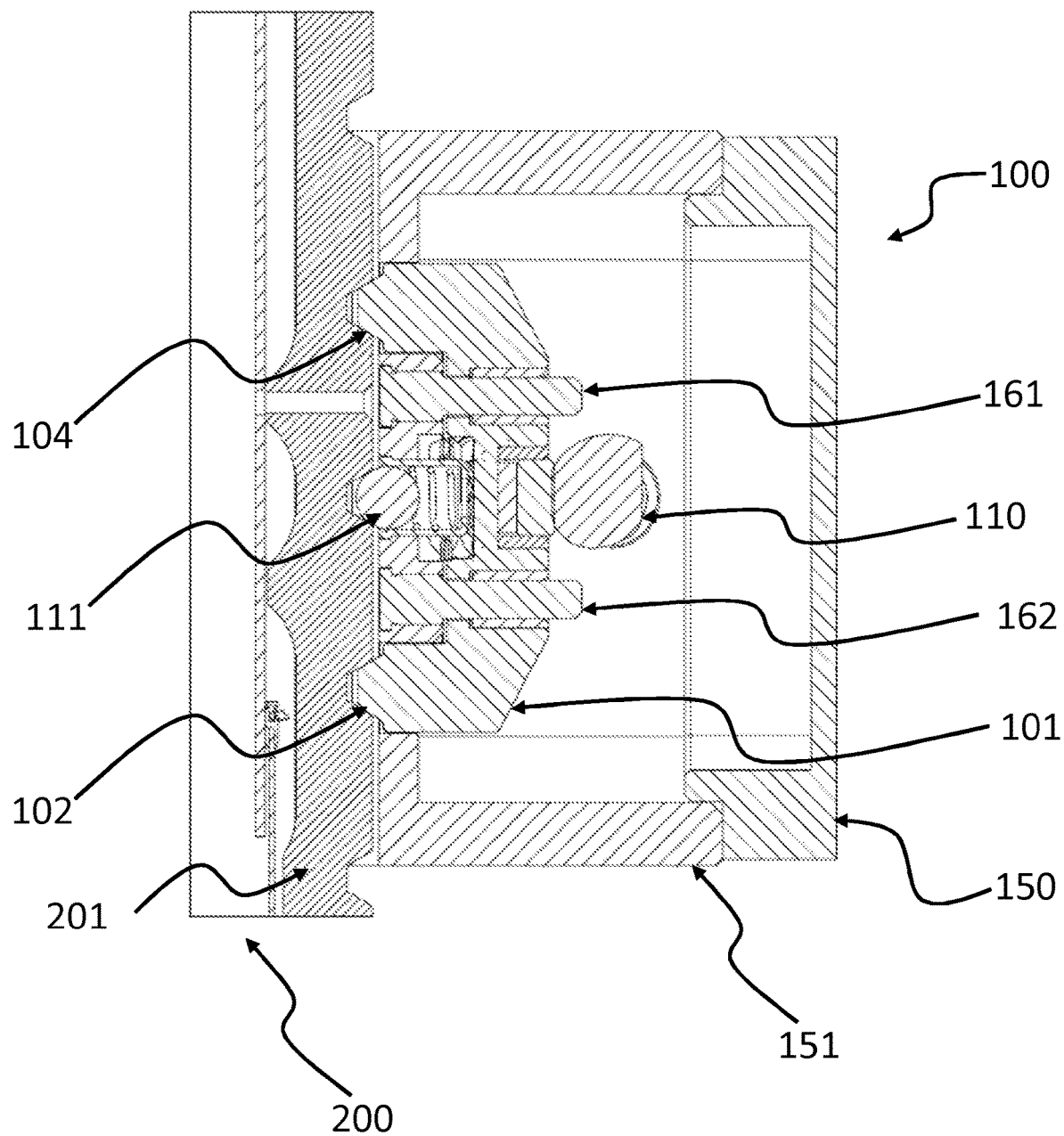
FIG. 4A illustrates a schematic bisected view of an exemplary locking system in the locked position in accordance with at least some embodiments of the present invention.

FIG. 4A shows in cross-section an exemplary embodiment of how the mounting rail 200 is interfaced via rail 201 with the mount 100. Mount 100 comprises housing elements 150 and 151, locking part body 101 which is further comprised of ends 104 and 102, a ball plunger 120 comprising ball 111 and spring 112 as well as a body, pins 162 and 161 which are configured to at least partly to participate in fastening the locking part body to the mount, and locking shaft 110. More specifically the part 101 is movable along pins 162 and 161 which are within holes 108 and 109 of the part. By rotating the locking shaft 110 the part may be moved along the pins. Springs 112, 113 and 114 may assist or retard the motion of the part 101 along the pins 161 and 161.

The locking part comprises a U-shaped body 101, called the locking part body along with the ball plunger. At the ends 102 and 104 of the U-shape, the locking part body has at least one of the following: protrusion, detent, pin or bearing, which are attached to or comprise each end to facilitate interfacing with the notches in the mount rail. In an exemplary embodiment the locking part has two ends, i.e. it is shaped like an U. However, in another exemplary embodiment the locking part has three ends, resulting in a W shape. Indeed, the locking part may comprise N number of ends in the context of this disclosure.

In FIG. 4A, the locking mechanism is in the closed position wherein the ends 104 and 102 are pressed into notches 224 and 222 respectively. For the sake of clarity, the notches are numbered in the subsequent figure.

Figure 4B:
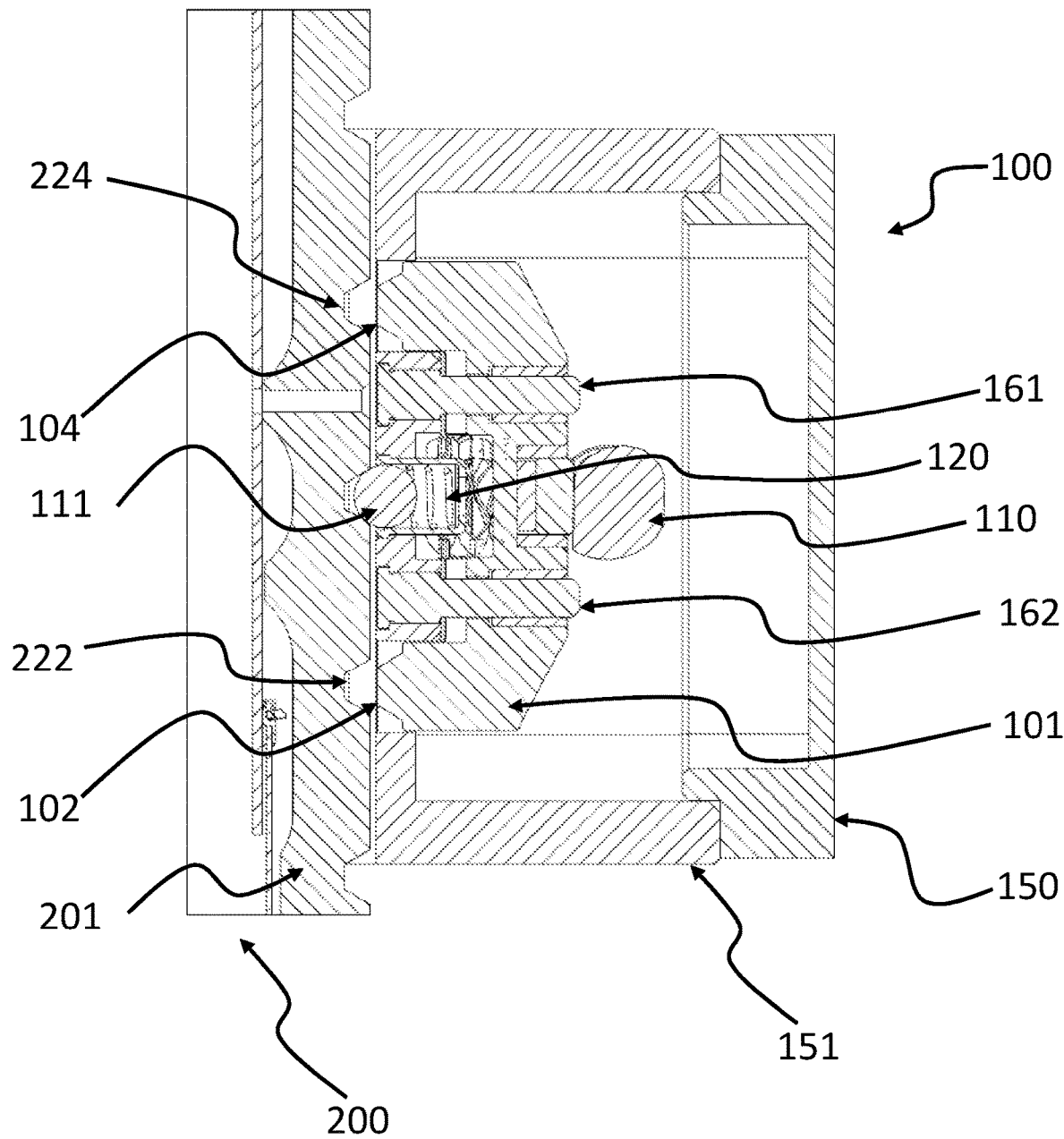
FIG. 4B illustrates a schematic bisected view of an exemplary locking system in the open position in accordance with at least some embodiments of the present invention.

FIG. 4B shows in cross-section an exemplary embodiment of the mounting rail 200 interfaced via the rail 201 with the mount 100. In the situation shown in FIG. 4B, the ends 104 and 102 along with the body 102 have been retracted along the pins 161 and 162 and the mount 100 is movably fixed to the mounting rail 200 via ball 111, which is pressed within notch 225 by means of a spring force provided by at least one of springs 112, 113 or 114 as discussed previously within the disclosure.

In at least some exemplary embodiments, such as the one shown in FIG. 1, the locking mechanism 100 is to connect the device 300 to the base plate 906 via mount 100 and rail 200. The locking mechanism is comprised of the following components: a housing, a locking part, a locking lever. In addition, the locking mechanism housing comprises at least a base plate, which allows the locking mechanism to be attached to a device such as an XY-router. The attachment is done using the methods described elsewhere in this disclosure, in particular the base plate and thus the locking mechanism housing along with the locking mechanism may be bolted to the device. For example unmarked holes can be seen in FIG. 7 which allow connection of the mount to the base plate via bolts.

Figure 5:
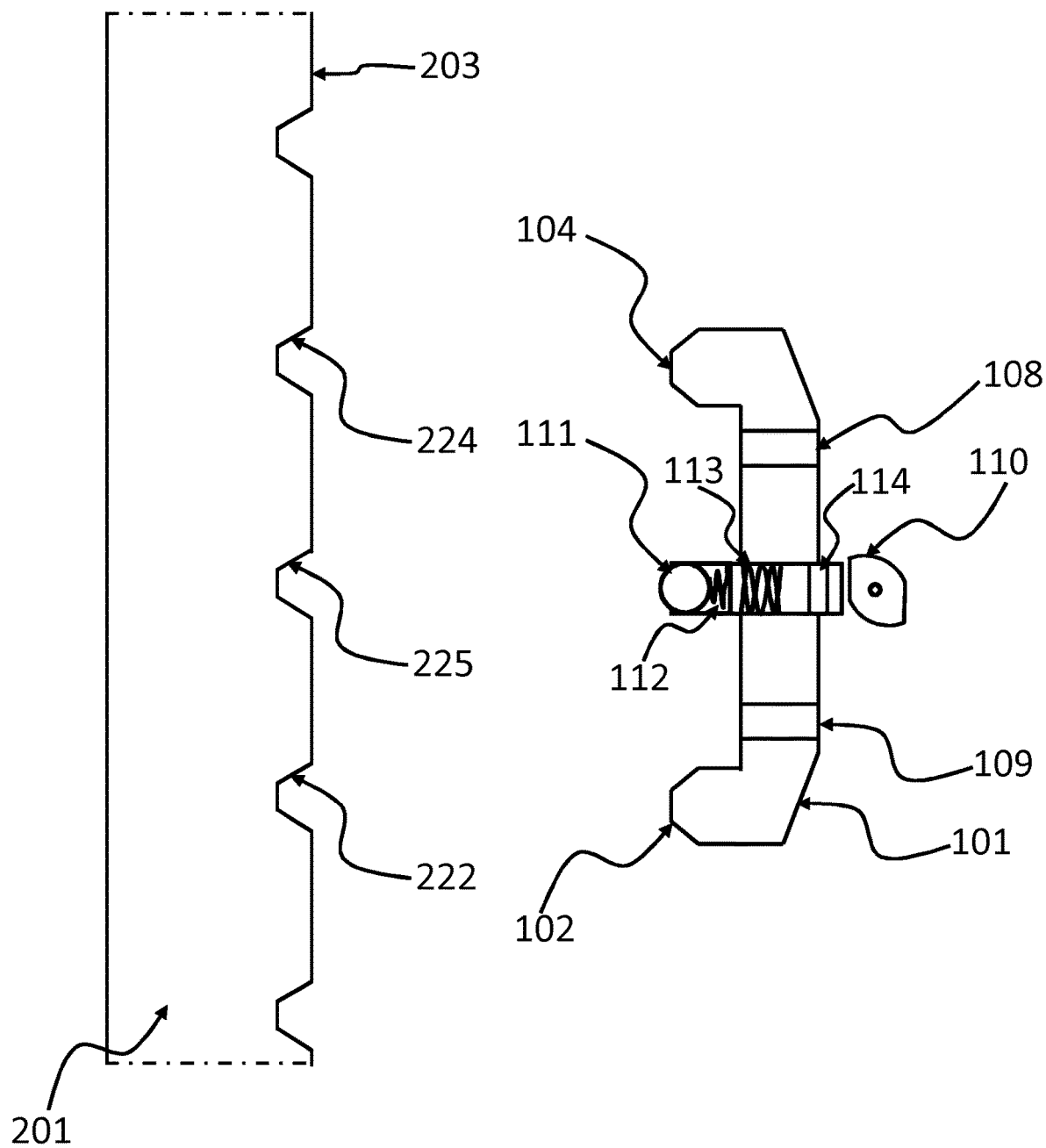
FIG. 5 illustrates a schematic view of an exemplary locking system in accordance with at least some embodiments of the present invention.

FIG. 5 shows in detail an exemplary embodiment of how the locking part body 101 interfaces with the rail 201. The embodiment shown in FIG. 5 is similar to that shown in FIG. 4 albeit for reasons of clarity, some parts have been omitted from the figure. Locking part body 101 comprises ends 104 and 102, ball plunger 120 comprising ball 111 and spring 112, pin holes 108 and 109. The locking part body 101 interfaces with the locking shaft 110 via at least central spring 113. Rail 201 comprises notches 223, 224 and 225 in the top surface 203, as well as other notches in the top surface and notches in the side surfaces (not shown in the figure). Notches 223, 224 and 225 are bevelled. Ends 104 and 102 are also bevelled. Therefore, in a situation where the locking part body 101 is actuated towards the rail 201 when the ends 104 and 102 of the locking part body are roughly positioned to correspond with the notches 224 and 223, the diagonal surfaces of the ends and notches correspond so that the ends are positioned in the center of their respective notches. This results in accurate positioning and mechanically robust locking of the rail with respect to the mount 100. In a further exemplary embodiment, the body of the ball plunger is fixed to the body of the locking part and is therefore immobile with respect to the body of the locking part, and the ball moves towards the notch a first distance, wherein the first distance is between 0.1 and 5 millimeters, preferably less than 2 millimeters.

The ball plunger comprises a spring 112 and a ball bearing 111, wherein the bearing is sized so that it interfaces with the notch 225 in a similar self-centering manner as the end 103 and the notch 223. When the locking shaft 110 is turned, the ball plunger is actuated towards the rail and the ends are pulled out of the notches as shown in FIG. 4B. However, the spring ball plunger 112 allows the ball to reverse if required, allowing the rail to be held in a static unlocked position for easy manual adjustment as previously discussed. Therefore, in at least some embodiments in accordance with the present disclosure, in the "open" position the ends are retracted from the rail and in the "closed" position, the ends are extended and are within the notches of the rail. Said open and closed positions may correspond to the degree of axial orientation of the locking shaft, for example the open position may be at zero degrees orientation and the closed position at 90 degrees of rotation. In further exemplary embodiments, the closed position may be at least one of the following rotations described herein in degrees: 45, 135, 180, 270, 360, 540, 720. In a further beneficial embodiment, the locking shaft may comprise a threaded portion so that the shaft must be unscrewed some turns before manipulating the shaft position, providing the benefit of eliminating accidental shaft movement due to e.g. vibrations. This embodiment may further comprise a corresponding nut or threaded hole as part of the mount 100.

Figure 6:
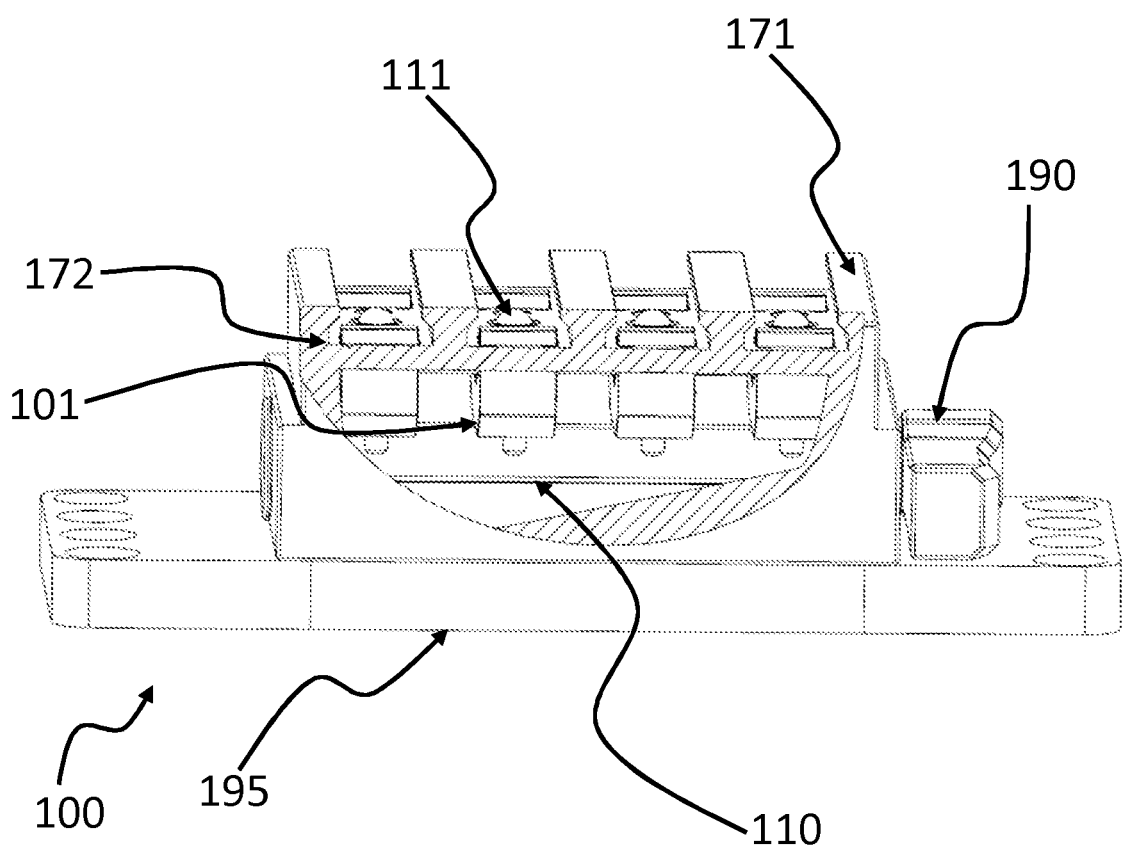
FIG. 6 illustrates a schematic view of an exemplary mount system in accordance with at least some embodiments of the present invention.

FIG. 6 shows in partial cross-section an exemplary embodiment of the mount 100. Mount 100 comprises four grooves 172, wherein the grooves are dimensioned in accordance with the profile of rails 201 to accommodate insertion of the rails 201 with a spacing between 0.5 mm and 3 mm. The spacing may vary according to the size of the rail. The spacing allows the components to be adjusted manually when the system is in the open position, but is sized so that the self-centering effect is obtained when the system is in the closed position. Corresponding to the four grooves 172 are four locking body parts 101 including ball plungers for each locking body part. The mount may comprise a single locking shaft 110 with the benefit of unlocking all rails simultaneously, or in the alternative there may be multiple mounts side by side, so that individual rails may be unlocked without disturbing other rails. The mount 100 also comprises locking shaft handle 190, top surface 171 and mounting plate 195, wherein the mounting plate 195 is attachable to mount 906. In further exemplary embodiments, the number of grooves 172 may be between 1 and 13. A plurality of grooves allows more devices to be mounted independently of one another.

Figure 7:
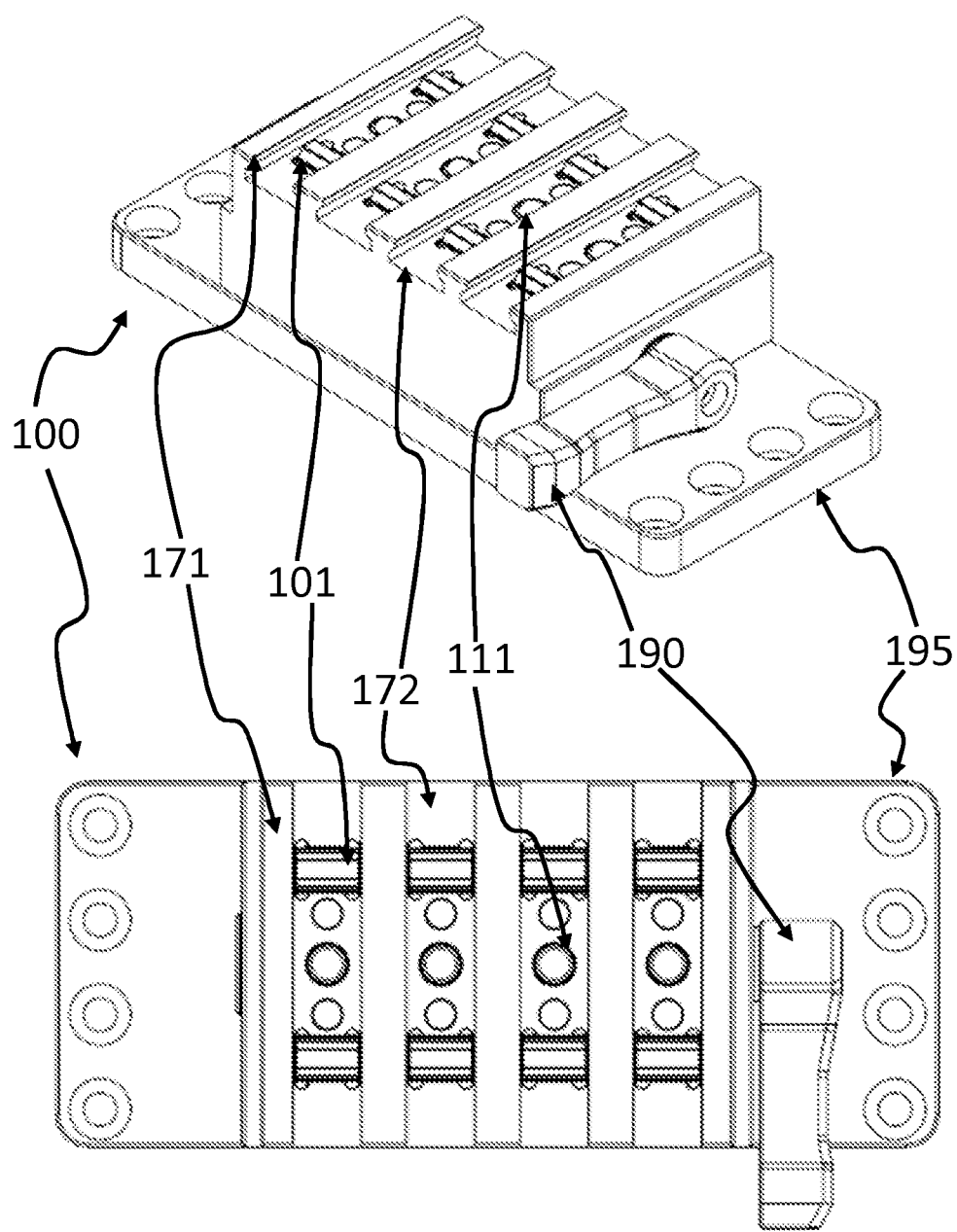
FIG. 7 illustrates a schematic view of an exemplary mount system in accordance with at least some embodiments of the present invention.

FIG. 7 shows a perspective view and a top view of an exemplary embodiment of the mount 100 in accordance with the exemplary embodiment presented in FIG. 6.

FIG. 8 shows a flowchart illustrating an exemplary method in accordance with the present disclosure. Steps 801, 802 and 803 have been described herein in a previous paragraph.

Some benefits and advantages of the embodiments presently disclosed are: The components and modules attached to a solution as described herein are easily adjustable to the required heights by the end-user. Said required height is of critical importance for liquid handling applications, e.g. in order to achieve correct liquid dispensing and for applications such as liquid level sensing. In addition, the present solution provides a very robust attachment system which is still adjustable very quickly. The solution is also self-centering which means that accuracy is retained in all three dimensions (XYZ) even after the module is manually adjusted. As the system is configured to allow for rapid changes of the vertical heights of the modules, it allows use of non-standard equipment such as liquid containers which may even be not fixed to the liquid handling system. Said containers are then at less risk of being knocked over by the modules if the z-height has been adjusted for each module correctly by the user.

The use of the ball plunger in conjunction with the notches of the rails means that the rail mount can easily be adjusted by the predefined increments of the distances between notches when the locking mechanism is in the open position. In addition, the rail mount will remain stationary when the locking mechanism is in the open position due to the ball plunger.

In addition, the provision of an independently moving vertical movement mechanism for each rail mount allows complex liquid handling operations to be carried out even when the router or manipulator moves the base only in the X and Y directions as opposed to the X, Y and Z directions. Thus, use of the invention provides more versatility for such equipment.

Fastening means usable with at least some of the embodiments disclosed herein include any of the following solutions singly or jointly: adhesive, hook-or-loop fastener, screws, bolts, clasps, locks, nails, snap-fits, snap-fasteners, zip-ties, magnets, electro-magnets.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in automated liquid handling devices, more specifically in attaching apparatuses to such devices in an adjustable manner.

| REFERENCE SIGNS LIST | |
|---|---|
| 100 | Mount apparatus, locking mechanism, first unit |
| 101 | Locking part, locking part body |
| 102, 104 | Ends, pins or detents of locking part body |
| 108, 109 | Holes for pins |
| 110 | Locking shaft |
| 111 | Ball |
| 112 | Plunger spring |
| 113 | Central spring |
| 114 | Cushioning spring |
| 120 | Ball plunger |
| 150, 151 | Housing elements |
| 161, 162 | Pins |
| 171 | Top surface of mount |
| 172 | Groove |
| 190 | Locking shaft handle |
| 195 | Mount plate of mount |
| 200 | Rail mount apparatus, second unit |
| 201 | Rail of rail mount apparatus |
| 202 | Bottom surface of rail |
| 203 | Top surface of rail |
| 204, 205 | Side surfaces of rail |
| 206, 207 | Side grooves of rail |
| 213 | Top grooves of rail |
| 223, 224, 225 | Top groove of rail |
| 230 | Housing of rail mount apparatus |
| 232 | Side panel of rail mount apparatus |
| 233 | Linear rail or Linear guideway |
| 235 | Mounting device or mounting shaft |
| 240 | Port |
| 300 | Module |
| 801, 802, 803 | Steps of method |
| 900 | Liquid handling apparatus |
| 901 | Table surface of liquid handling apparatus |
| 902 | Gantry of liquid handling apparatus |
| 903, 904 | Rails |
| 905 | Axis |
| 906 | Mount plate of liquid handling apparatus |

The invention claimed is:

1. An apparatus for mounting a device to a manipulator, the apparatus comprising: at least one first unit configured to be attached to a part of the manipulator, the first unit comprising: at least one groove and a locking part comprising:
a first end and at least one ball plunger assembly:
and at least one second unit configured to be arranged at least partially within the at least one groove of the first unit, the second unit comprising:
at least one notched rail configured to be inserted within the groove of the first unit, said notched rail comprising at least a first notch and a second notch, said first and second notches formed in the top surface of the notched rail, and
at least one mount mechanism configured to be attached to at least one device,
wherein the first unit and second unit are configured so that the ball of said ball plunger assembly is inserted into the first notch formed in the top surface of the notched rail,
wherein the locking part of the first unit has at least a closed position and an open position,
wherein in the closed position the locking part is configured so that the first end is inserted into the second notch in the top surface of the notched rail, thereby fixing the second unit in place with respect to the first unit, and
wherein in the open position the locking part is configured so that the first end is not within the second notch in the top surface of the notched rail, whereby the second unit is movable with respect to the first unit.

2. The apparatus according to claim 1, wherein the locking part comprises a second end, wherein the notched rail comprises a third notch formed in the top surface of the notched rail, and wherein the first unit is configured so that in the closed position said end is inserted into said third notch in the top surface of the notched rail, and wherein the second end is not inserted into said third notch in the top surface of the notched rail when the locking part is in the open position.

3. The apparatus according to claim 1, wherein the first unit is configured so that in the open position the ball of the ball plunger assembly is configured to retract from the first notch responsive to movement of the notched rail in a first direction.

4. The apparatus according to claim 1, wherein the first unit comprises a locking shaft having an asymmetrical cross-section so that the locking shaft has at least a first diameter and a second diameter.

5. The apparatus according to claim 4, wherein the open position of the first unit corresponds to the first diameter of the locking shaft and the closed position of the first unit corresponds to the second diameter of the locking shaft.

6. The apparatus according to claim 1, wherein the profile of the at least one groove of the first unit is configured to self-center the notched rail of the second unit in the closed position.

7. The apparatus according to claim 1, wherein the ball plunger assembly of the first unit comprises a plunger spring, a central spring and a cushion-type spring.

8. The apparatus according to claim 1, wherein the first unit comprises at least four grooves.

9. The apparatus according to claim 1, wherein the manipulator is a liquid handling system and the device is a pipette or liquid dispensing means.

* * * * *